(12) United States Patent
Queruel et al.

(10) Patent No.: US 10,907,039 B2
(45) Date of Patent: Feb. 2, 2021

(54) (METH)ACRYLIC COMPOSITION COMPRISING PARTICLES, ITS METHOD OF PREPARATION, ITS USE AND OBJECT COMPRISING IT

(71) Applicant: Arkema France, Colombes (FR)

(72) Inventors: Sylvain Queruel, Beaumont le Roger (FR); Cedric Roy, Corneville sur Risle (FR)

(73) Assignee: Arkema France, Colombes (FR)

( * ) Notice: Subject to any disclaimer, the term of this patent is extended or adjusted under 35 U.S.C. 154(b) by 25 days.

(21) Appl. No.: 16/321,105

(22) PCT Filed: Jul. 27, 2017

(86) PCT No.: PCT/EP2017/069086
§ 371 (c)(1),
(2) Date: Jan. 28, 2019

(87) PCT Pub. No.: WO2018/019965
PCT Pub. Date: Feb. 1, 2018

(65) Prior Publication Data
US 2019/0177530 A1   Jun. 13, 2019

(30) Foreign Application Priority Data

Jul. 29, 2016 (FR) .................................. 16 57403

(51) Int. Cl.
| | | |
|---|---|---|
| *C08L 33/12* | (2006.01) | |
| *C08L 83/04* | (2006.01) | |
| *G02B 5/02* | (2006.01) | |
| *G02B 1/04* | (2006.01) | |
| *F21V 3/06* | (2018.01) | |
| *B29C 48/00* | (2019.01) | |
| *B29K 33/00* | (2006.01) | |

(52) U.S. Cl.
CPC ............ *C08L 33/12* (2013.01); *F21V 3/0625* (2018.02); *G02B 1/04* (2013.01); *G02B 5/0205* (2013.01); *B29C 48/022* (2019.02); *B29K 2033/08* (2013.01); *C08L 2203/20* (2013.01); *C08L 2205/025* (2013.01); *C08L 2205/03* (2013.01)

(58) Field of Classification Search
CPC combination set(s) only.
See application file for complete search history.

(56) References Cited

U.S. PATENT DOCUMENTS

| | | |
|---|---|---|
| 5,831,774 A | 11/1998 | Toshima et al. |
| 6,908,202 B2 | 6/2005 | Graf et al. |
| 7,879,714 B2 | 2/2011 | Watanabe |
| 8,609,011 B2 | 12/2013 | Hoess et al. |

FOREIGN PATENT DOCUMENTS

| | | |
|---|---|---|
| DE | 102012216081 A1 | 3/2013 |
| JP | 01269902 A | 10/1989 |
| JP | 10087941 A2 | 4/1998 |
| JP | 10087945 A2 | 4/1998 |
| JP | 11021357 A2 | 1/1999 |
| JP | 11060966 A2 | 3/1999 |

OTHER PUBLICATIONS

Machine translation of JP 01-266902 (no date).*
"Basic Principles of Particle Size Analysis" from the Malvern Corporation (2014).*
Holger Senff on behalf of Arkema France, "Arkema France of Sep. 13, 2019, filed in European Patent Application 17742773.9-1107", Sep. 13, 2019, pp. 1-3.
Momentive Performance Materials Japan LLC, "Tospearl Marketing Bulletin", Accessed Jan. 30, 2020, pp. 1-4.

* cited by examiner

*Primary Examiner* — Marc S Zimmer
(74) *Attorney, Agent, or Firm* — Thomas F. Roland

(57) ABSTRACT

The present invention relates to a polymeric (meth) acrylic composition comprising polymeric silicone particles and polymeric (meth) acrylic particles. In particular the present invention relates to a polymeric(meth) acrylic composition comprising polymeric silicone particles having a weight average particle diameter between 1 μm and 10 μm and polymeric (meth) acrylic particles with a having a weight average particle diameter between 30 μm and 100 μm. The present invention concerns also the use of such a polymeric (meth) acrylic composition comprising polymeric silicone particles and polymeric (meth) acrylic particles. The present invention concerns also an object comprising or made of such a meth) acrylic composition comprising polymeric silicone particles and polymeric (meth) acrylic particles.

23 Claims, No Drawings

's # (METH)ACRYLIC COMPOSITION COMPRISING PARTICLES, ITS METHOD OF PREPARATION, ITS USE AND OBJECT COMPRISING IT

This application claims benefit, under U.S.C. § 119 or § 365 of PCT Application Number PCT/EP2017/069086, filed Jul. 27, 2017, and French Patent Application Number FR1657403, filed Jul. 29, 2016, these documents being incorporated herein by reference.

FIELD OF THE INVENTION

The present invention relates to a polymeric (meth) acrylic composition comprising polymeric silicone particles and polymeric (meth)acrylic particles.

In particular the present invention relates to a polymeric (meth) acrylic composition comprising polymeric silicone particles having a weight average particle diameter between 1 µm and 10 µm and polymeric (meth)acrylic particles with a having a weight average particle diameter between 30 µm and 100 µm.

The present invention concerns also the use of such a polymeric (meth) acrylic composition comprising polymeric silicone particles and polymeric (meth)acrylic particles.

The present invention concerns also an object comprising or made of such a meth) acrylic composition comprising polymeric silicone particles and polymeric (meth)acrylic particles.

Technical Problem

Thermoplastic polymers and especially (meth) acrylic polymers are widely used, including lightning applications. This is mainly due to its characteristics as a highly transparent polymer material with excellent resistance to ultraviolet radiation and weathering. So (meth) acrylic polymers are used for example in lamps, luminaires, light covers, displays, lit shelving, surfaces and illuminated signs.

The lightning applications have various requests on the (meth) acrylic polymers or the compositions based on (meth) acrylic polymers as light transmission, diffusing power. These compositions based on (meth) acrylic polymers comprise generally more or less spherical particles, which are also polymeric particles or organic or inorganic particles.

Additionally it is also of great interest to have a polymeric composition with a good compromise between light transmission and diffusing properties.

The objective of the present invention is to provide a (meth)acrylic polymer composition with satisfying optical properties for lightning applications.

A further objective of the present invention is to provide a process for producing a (meth)acrylic polymer composition with good optical properties and surface properties for lightning applications.

Another objective of the present invention is to provide a (meth)acrylic polymer composition which combines exceptional transmission and diffusion properties at the same time.

Another objective of the present invention is to provide a (meth)acrylic polymer composition that has a high light transmission, at least 80%, and at the same time having a high relative diffusing power and hiding power, in order to hide the light source.

Another objective of the present invention is to provide a (meth)acrylic polymer composition that has a high light transmission, at least 80%, and at the same time having a high relative diffusing power and hiding power, in order to hide the light source, with a reduced quantities of scattering particles.

Another objective of the present invention is to provide an object for lightning applications comprising a (meth)acrylic polymer composition with a high light transmission, at least 80%, and at the same time having a high relative diffusing power and hiding power, in order to hide the light source.

BACKGROUND OF THE INVENTION

Prior Art

The diffusion of light which increases the relative diffusion power and the hiding power is usually increased by adding scattering particles to the composition.

The document WO2004/034136 discloses a bulk diffuser for a flat panel display. The bulk light diffuser material may be a sheet or film comprising of polycarbonate and a particulate light diffusing component. PMMA and silicone particles are used separately in the examples, but not in combination together.

The document JP11060966 discloses a composition for high light diffusion performance. The disclosed composition comprises two kind of particles, one with an average diameter less than 5 µm and the other with an average diameter between 5 µm and 10 µm. The particles are either silicone or styrene based particles. However the composition has a low transmission.

The document DE102012216081 discloses the manufacturing of a light diffusing molded part by injection molding. The composition for injection molding comprises a matrix of polymethyl methacrylate and spherical plastic particles with a particle size of 1 to 24 µm.

The document U.S. Pat. No. 7,897,714 discloses silicone fine particles and a thermoplastic resin composition using the particles. The silicone fine particles are used as a diffuser and are having an average particle diameter of about 2.5 µm to 3.5 µm.

The document WO2004/098857 discloses an injection molding method for the production of light diffusing molded items. The molding material comprises a matrix of polymethyl methacrylate and spherical plastic particles with a particle size of 1 to 24 µm.

The document JP10087941 discloses a light diffusing acrylic resin composition and a light diffusing molding product. A silicon rubber powder is used having an average particle diameter of 0.1 to 50 µm.

The document JP10087945 discloses a light diffusing acrylic resin composition and a light diffusing formed body. A silicon rubber powder is used having an average particle diameter of 0.1 to 50 µm.

The document JP11021357 discloses a methacrylic resin comprising spherical particles of a crosslinked silicone resin.

The document U.S. Pat. No. 5,831,774 discloses a light diffusion composite. The light diffusion layer of the light diffusion material of said comprises an acrylic resin as a binder resin and light diffusing agents including acrylic resin particles and silicone resin particles. The two particles represent at least 40 parts by weight of the resin.

The document JP H01-269902 discloses a light diffusion plate for transmission type screen. The composition used comprises two type of particles, a cross-linked organic polymer and spherical silicone particles. The quantity of the cross-linked organic particles is in the composition comprising the two particles is from 2 to 6 parts by weight in view of the resin and that of the spherical silicone particles is from 0.02 to 0.5 parts by weight in view of the resin.

The prior art discloses either compositions comprising just one type of particles or a mixture of particles in the composition that does not have a satisfying compromise between light transmission and diffusing properties.

BRIEF DESCRIPTION OF THE INVENTION

Surprisingly it has been discovered that a composition comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c);
possesses an satisfying compromise between light transmission and diffusing power. Notably a polymeric sheet of 2 mm thickness of such a composition has a nearly the identical light transmission as a sheet without any particles.

It has also been found that a composition obtained by a process of preparation of a polymeric composition suitable for making objects said composition comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c),
and said process comprises the step of blending the components a), b) and c); yields to a composition having satisfying compromise between light transmission and diffusing power. Notably a polymeric sheet of 2 mm thickness prepared from of such a composition has nearly the identical light transmission as a sheet without any particles.

It has also been found that an object comprising a composition comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 is represents between 0.05 wt % and 2 wt % of the composition comprising the components a), b) and c) and that the particle PP2 represents between 5 wt % and 20 wt % of the composition comprising the components a), b) and c);
possesses an satisfying compromise between light transmission and diffusing power. Notably an object in form of polymeric sheet of 2 mm thickness of such a composition has a nearly the identical light transmission as a sheet without any particles.

Additionally it has been found that a composition comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c);
can be used for making a moulded object that possesses an satisfying compromise between light transmission and diffusing power. Notably a moulded object in form of polymeric sheet of 2 mm thickness of such a composition has a nearly the identical light transmission as a sheet without any particles.

DETAILED DESCRIPTION OF THE INVENTION

According to a first aspect, the present invention relates to composition comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 is represents between 0.05 wt % and 2 wt % of the composition comprising the components a), b) and c) and that the particle PP2 is represents between 5 wt % and 20 wt % of the composition comprising the components a), b) and c).

According to a second aspect, the present invention relates to a process of preparation of a polymeric composition (suitable for making objects said composition) comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c),
characterized that said process comprises the step of blending the components a), b) and c).

According to another aspect the present invention relates to the use of a composition comprising:
a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c) for making an object.

Still another aspect of the present invention relates to a object comprising a polymer composition or made of a polymeric composition, said polymer composition is comprising:

a) a (meth)acrylic polymer AP1
b) a polymeric silicone particle PP1 having a weight average particle diameter between 1 μm and 10 μm
c) a polymeric (meth)acrylic particle PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c).

By the term "alkyl(meth)acrylate" as used is denoted to both alkyl acrylate and alkyl methacrylate.

By the term "copolymer" as used is denoted that the polymers consists of at least two different monomers.

By the term "parts" as used herein is denoted "parts by weight".

By the term "thermoplastic polymer" as used is denoted a polymer that turns to a liquid or becomes more liquid or less viscous when heated and that can take on new shapes by the application of heat and pressure.

By the term "PMMA" as used in the present invention are denoted homo- or copolymers of methyl methacrylate (MMA), for the copolymer of MMA the weight ratio of MMA inside the PMMA is at least 50 wt %.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less then y.

With regard to the composition according to the invention it comprises a (meth)acrylic polymer AP1, polymeric silicone particles PP1 having a weight average particle diameter between 1 μm and 10 μm and polymeric (meth)acrylic particles PP2 having a weight average particle diameter between 30 μm and 100 μm, characterized that the particle PP1 represents between 0.05 wt % and 2 wt % of the composition comprising the components a), b) and c) and that the particle PP2 represents between 5 wt % and 20 wt % of the composition comprising the components a), b) and c). The weight ratios of the particles of component b) and c) are calculated on the sum of the three components a), b) and c).

Preferably the particle PP2 represents between 6 wt % and 20 wt % of the composition comprising the components a), b) and c), more preferably between 7 wt % and 20 wt %, still more preferably between 8 wt and 20 wt %, even more preferably between 9 wt % and 20 wt %, advantageously between 10 wt % and 20 wt %, more advantageously between 10 wt % and 19 wt % and most advantageously between 11 wt % and 19 wt %.

Preferably the particle PP1 represents between 0.06 wt % and 1.9 wt % of the composition comprising the components a), b) and c), more preferably between 0.07 wt % and 1.8 wt %, still more preferably between 0.08 wt and 1.7 wt %, even more preferably between 0.09 wt % and 1.6 wt %, advantageously between 0.09 wt % and 1.5 wt %, more advantageously between 0.09 wt % and 1.4 wt % and most advantageously between 0.1 wt % and 1.4 wt %.

With regard to the (meth)acrylic polymer AP1 it is a polymeric polymer chain comprising at least 50 wt % of monomers coming acrylic and/or methacrylic monomers. The (meth)acrylic polymer could also be a mixture of two or more (meth)acrylic polymer AP1 and AP2 or AP1 to APx.

The acrylic and/or methacrylic monomers are chosen from acrylic acid, methacrylic acid, esters of acrylic acid of esters of methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

Other comonomers can be copolymerized with the acrylic and/or methacrylic monomers as long as the (meth)acrylic polymer AP1 is comprising at least 50 wt % of monomers coming acrylic and/or methacrylic monomers in its polymeric chain. The other comonomers can be chosen from styrenic monomers as styrene or styrene deriviatives, acrylonitrile, vinylesters as vinylacetate. The amount of these comonomers is from 0 wt % to 50 wt %, preferably from 0 wt % to 40 wt %, more preferably from 0 wt % to 30 wt %, advantageously from 0 wt % to 20 wt %.

In a first preferred embodiment the (meth)acrylic polymer AP1 is a homo- or copolymer of methyl methacrylate (MMA) that comprises at least 50%, preferably at least 60%, advantageously at least 70% and more advantageously at least 80% by weight of methyl methacrylate.

The copolymer of methyl methacrylate (MMA) comprises between 50% and 99.9% by weight of methyl methacrylate and between 0.1 and 50% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth)acrylate. Preferably the comonomer is an alkyl acrylate in which the alkyl group having from 1 to 4 carbon atoms.

According to the first more preferred embodiment the copolymer of methyl methacrylate (MMA) comprises from 80% to 99.8% advantageously from 90% to 99.7% and more advantageously from 90% to 99.5% by weight of methyl methacrylate and from 0.2% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The (meth)acrylic polymer AP1 has a melt flow index (MFI) according to ISO 1133 (230° C./3.8 kg) between 0.1 g and 20 g/10 min. Preferably melt flow index is between 0.2 g and 18 g/10 min, more preferably between 0.3 g and 16 g/10 min, advantageously between 0.4 g and 13 g/10 min.

The (meth)acrylic polymer AP1 has a refractive index between 1.46 and 1.52, preferably between 1.47 and 1.52 and more preferably between 1.48 and 1.52.

The (meth)acrylic polymer AP1 has a light transmittance according to ASTM D-1003 (sheet of 3 mm thickness) of at least 85%, preferably 86%, more preferably 87%.

The (meth)acrylic polymer AP1 has a Vicat softening temperature of at least 90° C. The Vicat softening temperature is measured according to ISO 306:2013 (B50 method).

The composition according to the invention can comprise beside the (meth)acrylic polymer AP1 also an (meth)acrylic polymer AP2. The (meth)acrylic polymer AP1 and (meth)acrylic polymer AP2 form a mixture or a blend. This mixture or blend consists of at least one homopolymer and at least one copolymer of MMA, or a mixture of at least two homopolymers or two copolymers of MMA with a different average molecular weight or a mixture of at least two copolymers of MMA with a different monomer composition.

With regard to the polymeric silicone particle PP1, it is having a weight average particle diameter between 1 µm and 10 µm, the particles comprises polysiloxanes chains having an inorganic silicone-oxygen backbone chain.

The polymeric silicone particle PP1 has a refractive index between 1.30 and 1.45, preferably between 1.35 and 1.45, advantageously between 1.36 and 1.44.

The weight average particle diameter of the polymeric silicone particle PP1 is preferably between 1 µm and 9 µm, more preferably between 1 µm and 8 µm, still more preferably between 1 µm and 7 µm, even more preferably between 1 µm and 6 µm, advantageously between 1 µm and 5 µm and more advantageously between 1 µm and 4 µm.

The bulk density of a powder of the polymeric silicone particle PP1 is between 0.1 and 0.5 g/ml, preferably between 0.15 and 0.45 g/ml.

The polymeric silicone particle PP1 can for example be prepared according to US 2008/124549.

The polymeric silicone particle could also be a blend of two or more different silicone particles PP1a, PP1b . . . , as long as all silicone particles have the before mentioned characteristics.

With regard to the polymeric (meth)acrylic particle PP2 having a weight average particle diameter between 30 µm and 100 µm, it comprises at least 50 wt % of monomers coming from acrylic and/or methacrylic monomers in the polymer chains of the polymeric particle PP2.

In a first preferred embodiment the polymeric (meth)acrylic particle PP2 is a homo- or copolymer of methyl methacrylate (MMA) that comprises at least 50%, preferably at least 60%, advantageously at least 65% and more advantageously at least 70% by weight of methyl methacrylate.

The weight average particle diameter of the polymeric (meth)acrylic particle PP2 is preferably between 35 µm and 90 µm, more preferably between 35 µm and 60 µm, even more preferably between 40 µm and 60 µm and advantageously between 45 µm and 60 µm and most advantageously between 48 µm and 60 µm.

Preferably the polymeric (meth)acrylic particle PP2 is crosslinked. The weight ratio of the crosslinker in the (meth)acrylic particle PP2 is less than 5 wt %. The crosslinker is preferably chosen from an organic compound having at least one acrylic or methacrylic function and a second double bond which can polymerize as well.

The polymeric (meth)acrylic particle PP2 has a refractive index between 1.49 and 1.56, preferably between 1.50 and 1.55.

The polymeric (meth)acrylic particle PP2 can be prepared according to suspension polymerization.

The polymeric (meth)acrylic particle could also be a blend of two or more different (meth)acrylic particles PP2a, PP2b . . . , as long as all silicone particles have the before mentioned characteristics.

With regard to the process for the preparation a polymeric composition according to the invention, it comprises the step of blending the components a), b) and c).

Preferably the process is made by compounding.

Said process is also capable for the preparation of a polymeric composition suitable for making objects with said composition.

Preferably the process for the preparation of a polymeric composition suitable for making moulded objects comprises also at least one of the following steps mixing the a) (meth)acrylic polymer AP1 with b) polymeric silicone particle PP1 having a weight average particle diameter between 1 µm and 10 µm;

mixing a composition comprising a) (meth)acrylic polymer AP1 and a b) polymeric silicone particle PP1 having a weight average particle diameter between 1 µm and 10 µm with a c) polymeric (meth)acrylic particle PP2 having a weight average particle diameter between 30 µm and 100 µm;

mixing a composition comprising a) (meth)acrylic polymer AP1, a b) polymeric silicone particle PP1 having a weight average particle diameter between 1 µm and 10 µm and a c) polymeric (meth)acrylic particle PP2 having a weight average particle diameter between 30 µm and 100 µm with an additional quantity of (meth)acrylic polymer AP1 or a (meth)acrylic polymer AP2.

The (meth)acrylic polymer AP1, the polymeric silicone particle PP1 and polymeric (meth)acrylic particle PP2 in the process are the same as described before.

The weight ratio between silicone particle PP1 and polymeric (meth)acrylic particle PP2 in the composition is chosen that the polymeric (meth)acrylic particle PP2 is always in excess.

Preferably the ratio by weight of polymeric (meth)acrylic particle PP2 to silicone particle PP1 is at least 2/1, more preferably 5/2 and even more preferably at least 10/1, advantageously at least 20/1 and most advantageously at least 25/1.

According to the invention the weight ratio of the silicone particles PP1 in the composition is less important than weight ratio of the polymeric (meth)acrylic particle PP2. In the polymeric composition the absolute weight of the silicone particles PP1 is in minority in view of polymeric (meth)acrylic particle PP2.

According to the invention the weight ratio of the polymeric (meth)acrylic particle PP2 in the composition is more important than weight ratio of the silicone particles PP1. In the polymeric composition the absolute weight of the polymeric (meth)acrylic particle PP2 is in excess in view of silicone particles PP1.

The polymeric (meth)acrylic particle PP2 of the composition according to the invention have an excess quantity in wt % in the composition that is at least two times the quantity of the silicone particles PP1. The polymeric (meth)acrylic particle PP2 of the composition according to the invention have an excess quantity in wt % in the composition that is at most four hundred times than the quantity of the silicone particles PP1.

The weight average particle diameter of the polymeric (meth)acrylic particle PP2 in the composition is higher than the weight average particle diameter of the silicone particle PP1. The polymeric (meth)acrylic particle PP2 of the composition according to the invention have an weight average particle diameter that is at least three times higher than the weight average particle diameter of silicone particles PP1.

Preferably the weight average particle diameter of polymeric (meth)acrylic particle PP2 is at least five times higher, more preferably seven at least times higher, still more preferably at least ten times higher than the weight average particle diameter of silicone particles PP1.

The polymeric (meth)acrylic particle PP2 of the composition according to the invention have an weight average particle diameter that is at most one hundred times higher than the weight average particle of diameter silicone particles PP1. Preferably the weight average particle diameter of polymeric (meth)acrylic particle PP2 is at most eighty times higher, more preferably at most seventy times higher, still more preferably at most fifty times higher than the weight average particle diameter of silicone particles PP1.

The refractive index of silicone particles PP1 is less important than the refractive index of the (meth)acrylic polymer AP1 of the composition according to the invention. Preferably the difference of refraction index between the (meth)acrylic polymer AP1 and silicone particles PP1 is at least 0.01, more preferably at least 0.02 and still more preferably 0.03.

The refractive index of the polymeric (meth)acrylic particle PP2 is more important than the refractive index of the (meth)acrylic polymer AP1 of the composition according to the invention. Preferably the difference of refraction index between the polymeric (meth)acrylic particle PP2 and the (meth)acrylic polymer AP1 is at least 0.005, more preferably at least 0.01 and still more preferably 0.015.

Preferably in the composition according to the invention, the refractive index of silicone particles PP1 is less important than the refractive index of the (meth)acrylic polymer AP1 and the refractive index of the polymeric (meth)acrylic particle PP2 is more important than the refractive index of the (meth)acrylic polymer AP1.

According to a further aspect the present invention concerns a process for making an object by transforming and/or processing the polymeric composition according to the invention.

The transformation can be made by injection moulding, extrusion, coextrusion or extrusion/blow molding. Preferably the transformation is made by injection moulding or extrusion.

In a first preferred embodiment of the process for making an object is made by injection moulding. A moulded object is obtained.

The process for making a moulded object according to the invention comprises the steps of
melting the composition comprising the (meth)acrylic polymer AP1, silicone particles PP1 and polymeric (meth)acrylic particle PP2,
injecting the molten composition into a mould,
applying pressure to the mould at least until the mould is completely filled with the molten composition.

Most advantageously the melt flow index of the (meth)acrylic polymer AP1 in this first preferred embodiment of the process for making an object is between 1.5 g and 13 g/10 min In a second preferred embodiment of the process for making an object the transformation process is made by extrusion.

This process for making a object according to the invention comprises the steps of
feeding the polymeric composition comprising the (meth)acrylic polymer AP1, silicone particles PP1 and polymeric (meth)acrylic particle PP2 into an extruder,
melting the composition comprising a (meth)acrylic copolymer in the extruder,
extruding the molten composition.
The object obtained by extrusion possesses a certain surface roughness.

Most advantageously the melt flow index of the (meth)acrylic polymer AP1 in this second preferred embodiment of the process for making an object between 0.5 g and 13 g/10 min According to a still further aspect the present invention concerns the use of the composition for making an object or a moulded object.

The composition according to the invention can be used for making an object or a moulded object or article or be used to be part of an article.

The composition obtained by the process according to the invention can be used to be transformed directly into an article or object or can be part of an article or object.

According to a still further aspect the present invention concerns an object or a moulded object made of the polymeric composition according to the present invention.

The object or moulded object of the invention can be in form of a sheet, block, film, tube or profiled element. Preferably the moulded object is a sheet, which can be plain or slightly bent or curved.

Examples for object or moulded objects or articles are covers or plates for luminous devices.

In one embodiment the moulded object is a cover for a light source. The cover generally has a thickness of between 0.001 and 15 cm, preferably between 0.01 and 10 cm, more preferably between 0.05 and 7 cm, more preferably between 0.1 and 5 cm and even more preferably between 0.2 and 4 cm.

Additionally according to another aspect of the present invention the composition according to the invention can used as a covering for a point light source. The light source plus cover forms a luminous device. The cover may be a single layer, or may be a multi-layer structure. The cover is separated from the light source by a distance of between 0.11 and 50 cm, preferably between 1 and 40 cm, preferably between 2 and 20 cm and even more preferably between 3 and 20 cm.

The luminous device according to the invention has a variety of applications such as, for example:
interior lighting (living room lamps, office lamps, etc.);
advertising displays;
illuminated signs (in this case, the cover may especially have the form of a letter, a number, a symbol or any other sign);
industrial lightning;
outdoor lightning; and
automobile lighting (for example the luminous device may be a headlamp, a daytime light, a direction indicator, a stop light, a fog lamp, reversing light, etc.).

[Methods]

The optical properties of the polymers are measured according to following method: light transmittance and haze are measured according to the standard ASTM D1003, sheets of 2 mm thickness for molded samples. A haze-gard plus apparatus from BYK-Gardner is used.

Refractive index is measured with a refractometer.

Particle size: is measured by Laser diffraction with a Coulter Counter.

EXAMPLES

The silicone particle PP1 is additive 30-424 from Dow Corning. The weight average particle diameter is between 1 µm and 3 µm.

As polymeric (meth)acrylic particle PP2 in the examples is used a commercial product from ALTUGLAS BS110 having generally a weight average particle diameter between 35 μm and 60 μm and a batch having a weight average particle diameter of 50 μm was used.

Polymeric particle PP3 is an optical modifier, Paraloid EXL 5137 from Röhm and Haas, which is used according to its datasheet to reduce gloss and increase opalescence. The weight average particle diameter is between 5 μm and 10 μm.

EXAMPLES

A copolymer of methyl methacrylate having a melt flow index of 8 g/10 min is used as (meth)acrylic polymer AP1 and silicone particles PP1 and polymeric (meth)acrylic particle PP2 are blended with the (meth)acrylic polymer AP1. The blending is made by compounding with a two screw extruder.

COMPARATIVE EXAMPLES

The compositions are prepared as for examples with the same meth)acrylic polymer AP1. However the comparative examples comprise either only one kind of particle or two kind of particles with a particle size outside the claimed range.

All composition of examples and comparative examples are summarized in table 1.

TABLE 1 compositions of (meth)acrylic polymer AP1 with respective particles

|  | silicone particle PP1/ [wt %] | polymeric (meth)acrylic particle PP2/ [wt %] | Polymeric particle PP3/ [wt %] |
|---|---|---|---|
| Example 1 | 0.2 | 13.5 | — |
| Example 2 | 0.2 | 8.1 | — |
| Example 3 | 0.2 | 5.0 | — |
| Comparative example 1 | 0.2 | — | — |
| Comparative example 2 | 0.1 | — | — |
| Comparative example 3 | 0.3 | — | — |
| Comparative example 4 | 0.4 | — | — |
| Comparative example 5 | — | 18.0 | — |
| Comparative example 6 | — | 13.0 | 5 |

The compositions of the respective samples are transformed to sheets having a thickness of 2 mm.

TABLE 2 evaluation of sheets

|  | Haze [%] | T0 [a)] [%] | T1 [b)] | T2 [c)] | RDP1 [d)] | RDP2 [e)] |
|---|---|---|---|---|---|---|
| Example 1 | 100 | 89.5 | 42.2 | 17.0 | 0.53 | 0.81 |
| Example 2 | 100 | 90.1 | 45.3 | 20.1 | 0.50 | 0.78 |
| Example 3 | 100 | 91.4 | 48.7 | 22.5 | 0.47 | 0.75 |
| Comparative example 1 | 97 | 92.5 | 51.5 | 26.7 | 0.44 | 0.71 |
| Comparative example 2 | 79 | 93.2 | 70.7 | 49.0 | 0.24 | 0.47 |
| Comparative example 3 | 100 | 90.0 | 38.9 | 17.0 | 0.57 | 0.81 |
| Comparative example 4 | 100 | 86.5 | 29.8 | 11.6 | 0.65 | 0.87 |
| Comparative example 5 | 99 | 91.9 | 56.5 | 28.3 | 0.39 | 0.69 |
| Comparative example 6 | 100 | 90.0 | 42.0 | 17.5 | 0.53 | 0.81 | a) T0 Light transmission at distance 0 between the sample and the sphere entrance
b) T1 Light transmission at distance 1 inch (2.54 cm) between the sample and the sphere entrance
c) T2 Light transmission at distance 2 inch (5.08 cm) between the sample and the sphere entrance
d) RDP1—relative diffusing power 1 RPD1 = 1 − (T1/T0)
e) RDP2—relative diffusing power 2 RPD2 = 1 − (T2/T0)

The samples comprising silicone particles PP1 and polymeric (meth)acrylic particle PP2 have a good compromise between all characteristics, haze close to 100%, a transmission T0 close 90% or more, and a good relative diffusing power. While using less than 10 wt % of polymeric (meth)acrylic particle PP2 in combination with 0.2 wt % of silicone particles PP1 as in examples 2 and 3 a RDP2 of more than 0.70 is obtained, which requires much more quantity of particles as shown in comparative examples 5 and 6, for achieving this level.

Some of the compositions of table 1 are transformed to sheets by extrusion.

TABLE 3 evaluation of extruded sheets

|  | Thickness of Sheet [mm] | Haze [%] | T0 [a)] [%] | T1 [b)] [%] | T2 [c)] [%] | RDP1 [d)] | RDP2 [e)] | Gloss at 60° [GU] |
|---|---|---|---|---|---|---|---|---|
| Example 1 | 2.15 | 100 | 85.0 | 27.5 | 10.3 | 0.68 | 0.88 | 7.0 |
| Comparative example 3 | 2.30 | 100 | 87.6 | 32.6 | 13.5 | 0.63 | 0.85 | 78.0 |
| Comparative example 5 | 2.30 | 100 | 89.0 | 36.0 | 14.8 | 0.60 | 0.83 | 8.0 |
| Comparative example 6 | 2.25 | 100 | 85.0 | 29.7 | 11.2 | 0.65 | 0.87 | 9.5 | a) T0 Light transmission at distance 0 between the sample and the sphere entrance
b) T1 Light transmission at distance 1 inch (2.54 cm) between the sample and the sphere entrance
c) T2 Light transmission at distance 2 inch (5.08 cm) between the sample and the sphere entrance
d) RDP1—relative diffusing power 1 RPD1 = 1 − (T1/T0)
e) RDP2—relative diffusing power 2 RPD2 = 1 − (T2/T0)

The extruded sample comprising silicone particles PP1 and polymeric (meth)acrylic particle PP2 have a good compromise between all characteristics, haze of 100%, a transmission TO close 85%, a good relative diffusing power and a very low gloss.

The invention claimed is:

1. A polymeric composition comprising:
   a) a (meth)acrylic polymer AP1,
   b) a polymeric silicone particle PP1 having a weight average particle diameter between 1 µm and 6 µm,
   c) a polymeric (meth)acrylic particle PP2 having a weight average particle diameter between 35 µm and 90 µm, wherein said particle PP1 represents between 0.05 wt % and 2 wt % of the composition comprising the components a), b) and c) and that the particle PP2 represents between 5 wt % and 20 wt % of the composition comprising the components a), b) and c), and in that that the ratio by weight of polymeric (meth)acrylic particle PP2 to silicone particle PP1 is at least 10/1 and in that the weight average particle diameter of polymeric (meth)acrylic particle PP2 is at least ten times the weight average particle diameter of silicone particles PP1.

2. The polymeric composition according to claim 1 wherein said particle PP2 represents between 6 wt % and 20 wt % of the composition comprising the components a), b) and c).

3. The polymeric composition according to claim 1 wherein said particle PP2 represents between 10 wt % and 20 wt % of the composition comprising the components a), b) and c).

4. The polymeric composition according to claim 1 wherein said particle PP2 represents between 11 wt % and 19 wt % of the composition comprising the components a), b) and c).

5. The polymeric composition according to claim 1 wherein said particle PP1 represents between 0.1 wt % and 1.4 wt % of the composition comprising the components a), b) and c).

6. The polymeric composition according to claim 1 wherein said polymeric silicone particle PP1 has a refractive index between 1.30 and 1.45.

7. The polymeric composition according to claim 1 wherein said polymeric silicone particle PP1 has a weight average particle diameter preferably between 1 µm and 4 µm.

8. The polymeric composition according to claim 1 wherein in said polymeric (meth)acrylic particle PP2 at least 50 wt % acrylic and/or methacrylic monomers in the polymer chains of the polymeric particle PP2.

9. The polymeric composition according to claim 1 wherein said polymeric (meth)acrylic particle PP2 has a weight average particle diameter preferably between 45 µm and 60 µm.

10. The polymeric composition according to claim 1 wherein said (meth)acrylic polymer AP1 comprises at least 50 wt % acrylic and/or methacrylic monomers.

11. The polymeric composition according to claim 1 wherein said (meth)acrylic polymer AP1 is a homo- or copolymer of methyl methacrylate (MMA) comprising at least 50% by weight of methyl methacrylate.

12. The polymeric composition according to claim 1 wherein said weight ratio between silicone particle PP1 and polymeric (meth)acrylic particle PP2 in the composition is chosen that the polymeric (meth)acrylic particle PP2 is always in excess.

13. The polymeric composition according to claim 1 wherein the ratio by weight of polymeric (meth)acrylic particle PP2 to silicone particle PP1 is at least 2/1.

14. The polymeric composition according to claim 1 wherein said ratio by weight of polymeric (meth)acrylic particle PP2 to silicone particle PP1 is at least at least 25/1.

15. The polymeric composition according to claim 1 wherein said quantity of the polymeric (meth)acrylic particle PP2 of the polymeric composition in wt % in the composition is at most four hundred times than the quantity of the silicone particles PP1.

16. The polymeric composition according to claim 1 wherein said weight average particle diameter of polymeric (meth)acrylic particle PP2 is at most eighty times greater than the weight average particle diameter of silicone particles PP1.

17. The polymeric composition according to claim 1 wherein said weight average particle diameter of polymeric (meth)acrylic particle PP2 is at most fifty times greater more important than the weight average particle diameter of silicone particles PP1.

18. Process for the preparation of a polymeric composition comprising
   a) a (meth)acrylic polymer AP1
   b) a polymeric silicone particle PP1 having a weight average particle diameter between 1 µm and 10 µm
   c) a polymeric (meth)acrylic particle PP2 having a weight average particle diameter between 30 µm and 100 m,
   wherein said particle PP1 represents between 0.05 wt % and 2 wt % of the composition comprising the components a), b) and c) and that the particle PP2 represents between 5 wt % and 20 wt % of the composition comprising the components a), b) and c);
wherein said process comprises the step of blending the components a), b) and c).

19. The process according to claim 18, wherein said blending is made by compounding.

20. A process for making an object by transforming and/or processing the polymeric composition according to claim 1.

21. The process according to claim 20, wherein said process is made by extrusion.

22. An object comprising the polymeric composition according to claim 1.

23. The object according to claim 22, wherein said object is a luminous device.

* * * * *